(12) United States Patent
Roberts et al.

(10) Patent No.: US 8,600,383 B2
(45) Date of Patent: *Dec. 3, 2013

(54) APPARATUS AND METHOD FOR MAKING MEASUREMENTS IN MOBILE TELECOMMUNICATIONS SYSTEM USER EQUIPMENT

(75) Inventors: Gideon Roberts, Staffordshire (GB); Robert Harrison, Birmingham (GB); Richard George, Birmingham (GB); Gjalt Gerrit De Jong, Leuven (BE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,241

(22) Filed: Sep. 14, 2012

(65) Prior Publication Data

US 2013/0065591 A1    Mar. 14, 2013

Related U.S. Application Data

(63) Continuation of application No. 13/244,776, filed on Sep. 26, 2011, now Pat. No. 8,290,491, which is a continuation of application No. 12/267,412, filed on Nov. 7, 2008, now Pat. No. 8,351,940, which is a continuation of application No. 10/921,079, filed on Aug. 18, 2004, now Pat. No. 7,463,887.

(51) Int. Cl.
*H04W 4/00* (2009.01)

(52) U.S. Cl.
USPC ............. 455/435.2; 455/434; 455/435.1; 455/436

(58) Field of Classification Search
USPC ............. 455/435.1–435.3, 436–444
See application file for complete search history.

(56) References Cited

U.S. PATENT DOCUMENTS

| | | | |
|---|---|---|---|
| 5,452,471 A | 9/1995 | Leopold et al. | |
| 5,802,473 A | 9/1998 | Rutledge et al. | |
| 5,822,696 A * | 10/1998 | Bergkvist | 455/436 |
| 5,999,814 A | 12/1999 | Cuffaro et al. | |
| 6,138,018 A * | 10/2000 | Pashtan et al. | 455/435.2 |
| 6,377,803 B1 * | 4/2002 | Ruohonen | 455/434 |

(Continued)

FOREIGN PATENT DOCUMENTS

| | | |
|---|---|---|
| FR | 2742291 | 6/1997 |
| GB | 2385745 | 8/2003 |

OTHER PUBLICATIONS

U.S. Notice of Allowance for U.S. Appl. No. 10/921,079, dated Sep. 2, 2008, 8 pages.

(Continued)

*Primary Examiner* — Dominic E Rego
(74) *Attorney, Agent, or Firm* — Finnegan, Henderson, Farabow, Garrett & Dunner LLP

(57) ABSTRACT

A method and apparatus for selecting cells in a mobile telecommunications system, the system comprising a network of a plurality of cells of a Universal Mobile Telecommunications Systems (UMTS) and a network of a plurality of cells of a second Radio Access Technology (RAT), the method comprising, at a user equipment device: when in UMTS mode, flagging in a neighboring cell list stored on the user equipment device information for a cell of a second RAT which is known to be unsuitable for selection. Information from the neighboring cell list information for the flagged cell may be removed, in particular for a limited period of time.

97 Claims, 5 Drawing Sheets

(56) References Cited

U.S. PATENT DOCUMENTS

| | | | |
|---|---|---|---|
| 6,393,279 B1 * | 5/2002 | Lee | 455/426.1 |
| 6,553,231 B1 | 4/2003 | Karlsson et al. | |
| 7,123,910 B2 * | 10/2006 | Lucidarme et al. | 455/434 |
| 7,127,253 B2 | 10/2006 | Chen | |
| 7,133,702 B2 * | 11/2006 | Amerga et al. | 455/574 |
| 7,184,710 B2 | 2/2007 | Hogan | |
| 7,266,381 B2 * | 9/2007 | Charles | 455/456.4 |
| 7,286,801 B2 | 10/2007 | Amerga et al. | |
| 7,308,258 B2 * | 12/2007 | Demir et al. | 455/434 |
| 7,436,843 B2 * | 10/2008 | Gustafsson et al. | 370/401 |
| 7,463,887 B2 | 12/2008 | Roberts et al. | |
| 7,477,896 B2 * | 1/2009 | Rick et al. | 455/436 |
| 7,546,132 B2 * | 6/2009 | Lee et al. | 455/503 |
| 7,596,378 B1 * | 9/2009 | Nizri et al. | 455/448 |
| 7,634,272 B2 * | 12/2009 | Yamashita et al. | 455/444 |
| 7,949,337 B2 * | 5/2011 | Choi | 455/440 |
| 2001/0041572 A1 | 11/2001 | Lundqvist | |
| 2001/0044301 A1 | 11/2001 | Moore | |
| 2002/0032032 A1 * | 3/2002 | Haumont et al. | 455/436 |
| 2002/0197992 A1 * | 12/2002 | Nizri et al. | 455/435 |
| 2003/0040311 A1 | 2/2003 | Choi | |
| 2003/0125073 A1 * | 7/2003 | Tsai et al. | 455/552 |
| 2004/0043798 A1 | 3/2004 | Amerga et al. | |
| 2004/0109431 A1 * | 6/2004 | Abrahamson et al. | 370/342 |
| 2004/0162074 A1 * | 8/2004 | Chen | 455/437 |
| 2004/0180656 A1 * | 9/2004 | Stephan et al. | 455/434 |
| 2004/0192313 A1 * | 9/2004 | Otting | 455/446 |
| 2005/0003817 A1 * | 1/2005 | Ormson et al. | 455/435.2 |
| 2005/0044130 A1 | 2/2005 | Sillasto et al. | |
| 2005/0075074 A1 | 4/2005 | Benson et al. | |
| 2005/0079870 A1 | 4/2005 | Rick et al. | |
| 2005/0085232 A1 | 4/2005 | Laitinen et al. | |
| 2005/0090224 A1 | 4/2005 | Dorsey et al. | |
| 2005/0186984 A1 | 8/2005 | Lundell et al. | |
| 2005/0277416 A1 | 12/2005 | Tolli et al. | |
| 2006/0009158 A1 | 1/2006 | Bernhard et al. | |
| 2007/0298790 A1 | 12/2007 | Ormson et al. | |
| 2008/0039084 A1 * | 2/2008 | Benveniste et al. | 455/434 |
| 2009/0207774 A1 | 8/2009 | Lee et al. | |

OTHER PUBLICATIONS

U.S. Notice of Allowance for U.S. Appl. No. 12/267,412, dated Aug. 31, 2012, 7 pages.

U.S. Notice of Allowance for U.S. Appl. No. 13/244,776, mailed Jun. 13, 2012, 8 pages.

U.S. Office Action for U.S. Appl. No. 10/921,079, dated Mar. 17, 2008, 11 pages.

U.S. Office Action for U.S. Appl. No. 10/921,079, dated Sep. 7, 2007, 9 pages.

U.S. Office Action for U.S. Appl. No. 12/267,412, dated Mar. 9, 2012, 5 pages.

U.S. Office Action for U.S. Appl. No. 13/244,776, dated Dec. 16, 2011, 7 pages.

\* cited by examiner

APPARATUS AND METHOD FOR MAKING MEASUREMENTS IN MOBILE TELECOMMUNICATIONS SYSTEM USER EQUIPMENT

CROSS REFERENCE TO RELATED APPLICATION

The present application is a continuation application of patent application Ser. No. 13/244,776, filed Sep. 26, 2011 (now allowed) now U.S. Pat. No. 8,290,491, which is a continuation of application Ser. No. 12/267,412 filed Nov. 7, 2008 (now allowed) now U.S. Pat. No. 8,351,940, which is a continuation of application Ser. No. 10/921,079 filed Aug. 18, 2004, (now U.S. Pat. No. 7,463,887 issued Dec. 9, 2008), the contents of which are incorporated herein by reference.

BACKGROUND

1. Technical Field

This application relates to a dual mode mobile telecommunication device in general (for instance a UMTS (Universal Mobile Telecommunications System) and GSM (Global System for Mobile Communications) dual mode device), and to an apparatus and method for selecting cells in mobile telecommunications system user equipment. The invention also relates to Mobile Stations (MS) and User Equipment (UE) which support at least two Radio Access Technologies (RATs).

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for COMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS and with GSM protocols. The 3GPP 25.331 specification, v.3.18.0, referred to herein as the 25.331 specification, addresses the subject of the Radio Resource Control (RRC) protocol specification. The 3GPP 25.304 specification, v.3.14.0, referred to herein as the 25.304 specification, addresses the subject of UMTS User Equipment (UE) procedures in idle mode and procedures for cell reselection in connected mode between the UMTS Terrestrial Radio Access Network (UTRAN) and the UE.

Such a UE undertakes frequent measurement procedures. Clause 8.4 of the 25.331 standard and its sub-clauses and clause 14 and its sub-clauses relate to the measurement procedures to be undertaken by the UE as do clause 5 and its sub-clauses of the 25.304 specification. Both the 25.331 standard (and in particular clause 8.4 and its sub-clauses and clause 14 and its sub-clauses) and the 25.304 standard (and in particular clause 5.2.3.1 and its sub-clauses) are incorporated herein by reference.

When camped on a UMTS cell, the UE shall regularly search for a better cell according to the cell reselection criteria. If a better cell is found, the UE should attempt to select that cell. A change of cell may imply a change of RAT.

The 3GPP specifications allow a dual-mode UE to repeatedly attempt to camp on a cell using another RAT when the cell is known to be unavailable just because it happens to have the strongest available transmission signal.

For a dual-mode UE operating in UMTS idle mode (or CELL_PCH, URA_PCH or CELL_FACH states) and a GSM cell is initially found to be the best cell, problems can arise if the GSM cell is unsuitable or unavailable for selection, for example, if synchronization cannot be achieved or system information cannot be decoded. Each unsuccessful attempt to reselect to the unsuitable/unavailable GSM cell results in a short loss of service, and the UE will be unresponsive to attempts at incoming communication. It will therefore be seen that there is a need to avoid such repeated interruptions.

Further, battery power in the UE can also be wasted by repeated attempts of the UE to change its operational mode between RATs every few seconds. With reference to clause 5.5.2.2.3 of the 3GPP 25.133 specification, v 3.18.0, the minimum interruption time when attempting to move from a UMTS cell to a GSM cell is 40 ms, and is likely to be considerably longer, perhaps even greater than 100 ms.

There are thus proposed strategies for User Equipment (UE) measurement procedures, which are appropriate in UMTS idle mode and during cell reselection to a GSM cell. A number of such strategies are detailed below.

Other aspects and features of the present invention will become apparent to those ordinarily skilled in the art upon review of the following description of specific embodiments of an apparatus and method for carrying out User Equipment (UE) procedures in idle mode and procedures for cell reselection in connected mode.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for making measurements in mobile telecommunications system user equipment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for selecting cells in a mobile telecommunications system, the system comprising a network of a plurality of cells and at least one user equipment device. The method comprises, at the user equipment device, when in UMTS mode, flagging in a neighboring cell list stored on the user equipment device information for a cell of a second RAT which is known to be unsuitable for selection.

In other aspects, the invention encompasses an apparatus and a computer-readable medium configured to carry out the foregoing steps. In particular, the method may be implemented in a mobile telecommunications device, with or without voice capabilities, or other electronic devices such as handheld or portable devices.

There is also provided a method of maintaining information relating to selecting cells that are potentially suitable for a user equipment to select/camp on in a telecommunications system, the system comprising a network of a plurality of cells of a Universal Mobile Telecommunications System and a network of a plurality of cells of a second Radio Access Technology (RAT), the system further comprising at least one user equipment device, the method comprising, at the user equipment device: storing information relating to cells of the network; from the stored maintained information, identifying a cell which meets a cell selection criterion; determining whether the identified cell is of the other RAT; and, if the identified cell is determined to be of the other RAT: determining whether the identified cell is suitable for selection; and if the identified cell is not suitable, flagging the cell as being unsuitable for selection.

Figure 1:
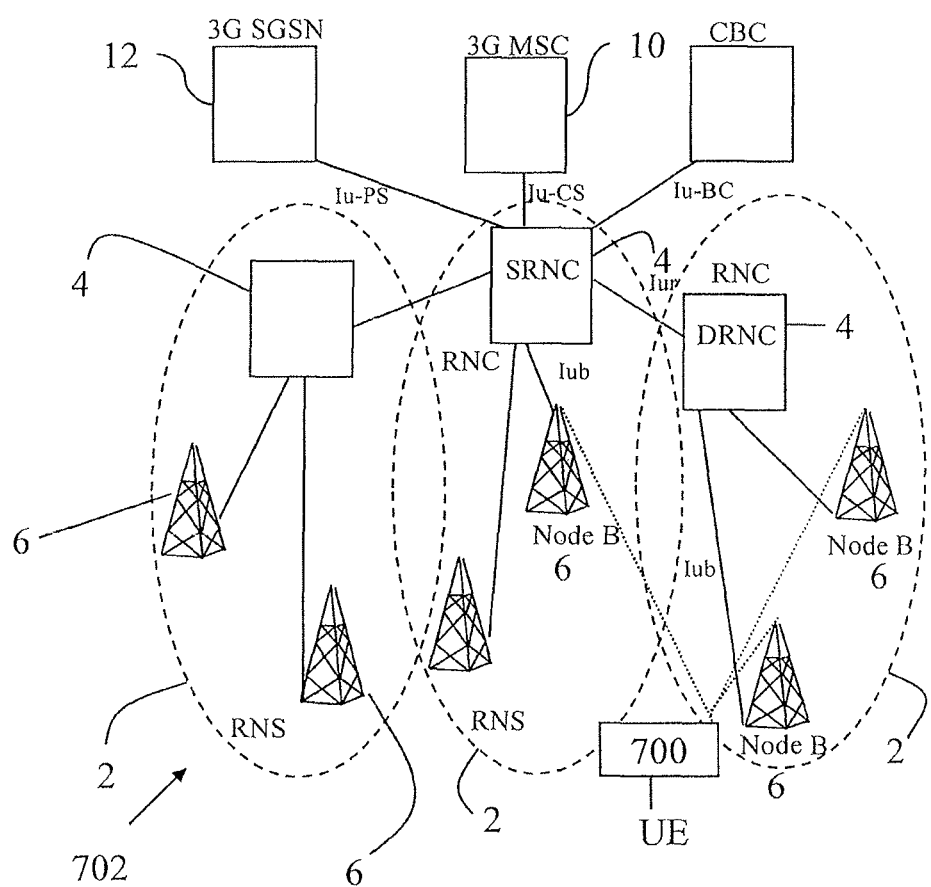
FIG. 1 shows an overview of a network and UE device.

FIG. 1 shows an overview of a network and a UE device. Clearly in practice there may be many UE devices operating with the network but, for the sake of simplicity, FIG. 1 only shows a single UE device. For the purposes of illustration, FIG. 1 also shows a network having a few components. It will be clear to a person skilled in the art that in practice a network will include far more components than those shown.

FIG. 1 shows an overview of the radio access network 702 (RAN) used in a UMTS system or a GSM network. The network 702 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 700 may be mobile within the radio access network. Radio connections (indicated by the straight dotted lines in FIG. 1) are established between the UE and one or more of the Node Bs in the UTRAN.

The RNC 4 controls the use and reliability of the radio resources within the RNS 2. Each RNC 4 may also be connected to a 3G mobile switching center 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TOO).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Section 5.2.6 of the 25.304 standard sets out the cell reselection criterion.

In the following description, reselection between cells operating in FDD mode and attempting to change to GSM mode will be considered. However the technique is also applicable in reselection between cells operating in TDD mode and attempting to change to GSM mode. The technique is also applicable for reselection between CDMA2000 cells/GSM cells/GPRS cells.

The Network Operator transmits in the UMTS cell to all UEs in the UMTS cell, over the broadcast channel (BCCH), a GSM Neighbouring Cell list. Alternatively, the list is derived at the UE from information transmitted by the Network Operator. This list contains information relating to GSM cells which are adjacent to, or in the vicinity of, the UMTS cell in question.

Included in the GSM neighboring cell list is information relating to the transmission frequency of each neighboring GSM cell respectively. Accordingly, the UE has prior knowledge, at least in one mode of operation, of all the frequencies at which the neighboring GSM cells transmit. As such, the UE can scan these frequencies for signal strengths of the respective GSM cells. Once the respective frequencies have been scanned, the UE populates the GSM neighboring cell list with information relating to cell ranking according to the cell reselection criteria for each cell at its respective transmission frequency.

In a similar fashion, a UMTS neighboring cell list is transmitted or compiled, thereby allowing the UE to have prior knowledge of the transmission frequencies of the neighboring UMTS cells and to scan these frequencies accordingly. This list is populated with transmission frequency information in a similar fashion to the way it is carried out for the GSM neighboring cell list.

The GSM neighboring cell list, as transmitted by the Network Operator, does not take into account the status of the GSM cells; i.e. a cell may be temporarily barred but will still be listed in the GSM neighboring cell list.

As will be discussed below, when the UE has determined that a GSM cell is barred, the GSM cell is removed by the UE from the GSM neighboring cell list stored locally at the UE until expiry of a time interval, Tbarred• This time interval is configurable, but a suitable time period may be 300 seconds.

During this time period, Tbarred, the "barred" cell is not to be considered as a candidate for reselection by the UE.

The GSM neighboring cell lists may contain GSM cells that are barred and which are to be removed from the lists until expiry of the time interval, $T_{barred}$. Alternatively, there may be a list for containing details of cells which are barred and details of the barred/unsuitable cell is added to this list. The barred cells may keep their indices in the list but no measurement is performed, i.e., no scan at the frequency of that cell is made. The UE may re-read and/or re-build the GSM neighboring cell list upon expiry of the time interval $T_{barred}$ for the or all barred cells, if more than one barred cell is found. The time, $T_{barred}$, may be set individually for each barred cell.

Figure 2:
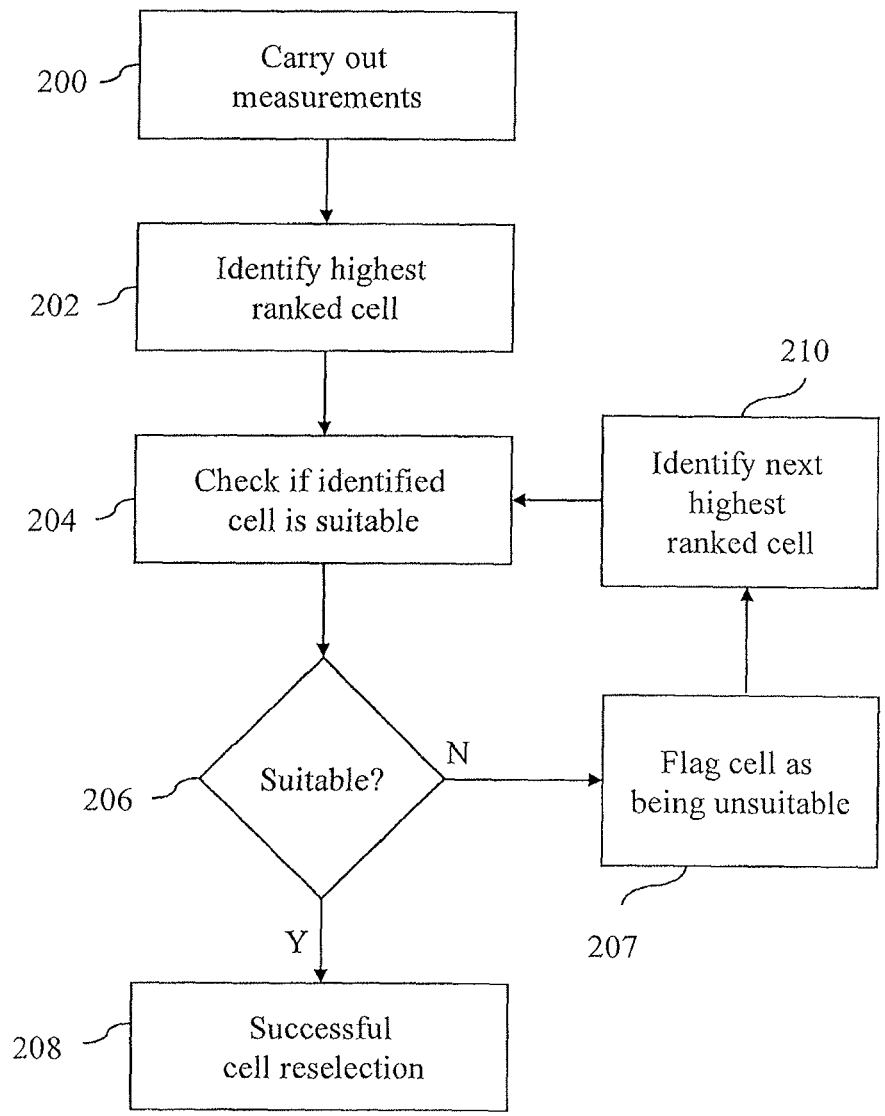
FIG. 2 is a flow diagram illustrating a first embodiment of a process for cell selection.

A process of a cell reselection process is illustrated in FIG. 2 which is a flow chart illustrating the operation of a UE device. At intervals the UE device carries out measurements, step 200. The UE carries out measurements on neighboring cells according to its capability.

The UE then determines whether the measurement data meets a predetermined criterion and stores the measurement data in an order relative to the meeting of the criterion (a cell ranking list). An example of the cell reselection criteria is given in 5.2.6 of the 25.304 specification.

Table 1 shows an example of the signal measurement results for a UE, with the highest ranked cells being shown at the top of the table and the lowest ranked cells shown at the bottom.

TABLE 1

| | | |
|---|---|---|
| $C_A$ | $f_1$ | GSM |
| $C_D$ | $f_7$ | GSM |
| $C_B$ | $f_2$ | UMTS |
| $C_E$ | $F_8$ | GSM |
| $C_F$ | $f_3$ | UMTS |
| $C_G$ | $f_4$ | GSM |
| $C_C$ | $f_5$ | GSM |
| $C_I$ | $f_6$ | GSM | where $C_A$ indicates a signal from cell A, $f_1$ indicates a signal at frequency $f_1$, GSM indicates that the cell is a GSM cell and UMTS indicates that the cell is a UMTS cell. Typically, signal measurement results for the GSM network and for the UMTS network are compiled in separate tables for each network and a comparison or consolidation between the two tables is made prior to determination of the highest ranked cell. However, for the sake of simplicity in this and following examples a consolidated table of results will be used.

When compiling the ranking list of the various neighboring GSM and UMTS cells, the time period for the comparison between GSM cells and UMTS cells is configurable; for further details see clause 5.2.6 of the 25.304 specification.

The UE uses these measurement results to identify the highest ranked cell, step 202. In the example shown in table 1 this is the signal from GSM cell A at frequency $f_1$. The UE then checks whether the identified cell at the identified frequency is suitable, step 204. If the identified cell at the identified frequency is suitable, step 206, successful cell reselection has occurred, step 208, and the UE continues operation. However the identified cell may not be suitable. For example, if the system information from a cell which informs the UE how to connect to the cell has an error in it, then the cell is deemed to be unsuitable.

However if the identified cell is not suitable at step 206, the UE then flags the identified cell as unsuitable, step 207, for instance using an identifier, or removes the unsuitable cell from the neighboring cell list. The cell may be flagged as unsuitable, to leave vacant the information relating to the unsuitable cell from the maintained neighboring cell list. The UE then proceeds to identify the next highest ranked cell, step 210. In the example shown in table 1, this is GSM cell 0 at a frequency $f_7$ i.e., a different GSM cell operating at a different frequency as the previously identified cell. The UE then attempts to connect with this identified cell at step 204 and if successful a successful cell connection with GSM cell D at frequency h is made. Otherwise the UE continues to identify the next highest ranked cells and to attempt to connect with these cells until a successful connection is made or connection to all potential cells has failed, in which case the UE returns a message to the user, for instance "emergency calls only" or "no network coverage".

The UE then periodically repeats the search for a suitable cell omitting from the search any cells which are flagged as unsuitable. Thus, if a GSM cell is not suitable or is barred, the UE does not repeatedly attempt to camp on to the unsuitable/barred cell.

If the UE selects UMTS cell B because GSM cells A and D are unsuitable, then during the next cell reselection evaluation, cells A and D are excluded from the next cell reselection process. Thus, if the GSM cell is not suitable or barred, the UE does not repeatedly attempt to camp on to the unsuitable/barred cell.

Note that the process may also be carried out without identifying the highest ranked cell (i.e., steps 200, 202 and 210 may be omitted). In this case, the UE, when in UMTS mode, flags in a neighboring cell list stored on the user equipment device information for a cell of the second RAT which is known to be unsuitable for selection.

In an embodiment of the invention, when an identified cell is deemed unsuitable, it is omitted from the GSM neighboring cell list. Alternatively, the identified cell can be added to a list of cells known to be unsuitable. During the next reselection evaluation, the UE performs measurements on cells listed in the GSM neighboring cell list but omits the cell previously identified as the unsuitable/barred cell.

Figure 3:
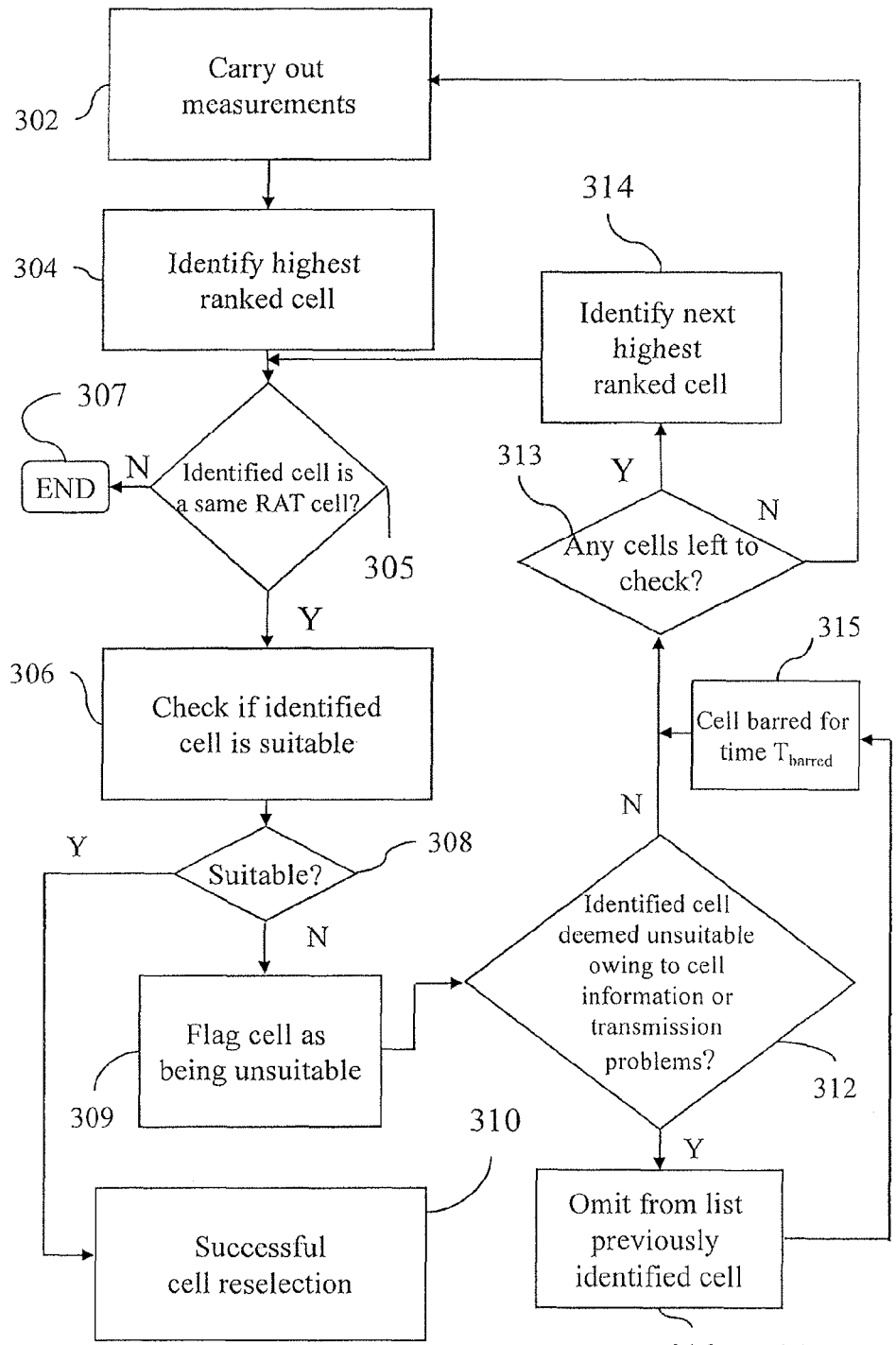
FIG. 3 is a flow diagram illustrating a second embodiment.

FIG. 3 shows a further embodiment of the technique. In this embodiment, the UE carries out measurements to search for the highest ranked cell in each cell type (i.e. GSM or UMTS) required according to its capabilities, step 302. An example of the measurements made by a UE is shown in table 2, with the highest ranked cells being shown at the top of the table and the lowest ranked cells shown at the bottom.

TABLE 2

| | | |
|---|---|---|
| $C_A$ | $f_1$ | GSM |
| $C_D$ | $f_7$ | GSM |
| $C_B$ | $f_2$ | UMTS |
| $C_E$ | $F_8$ | GSM |
| $C_F$ | $f_3$ | UMTS |
| $C_G$ | $f_4$ | GSM |
| $C_C$ | $F_5$ | GSM |
| $C_I$ | $F_6$ | GSM |

The UE then identifies the highest ranked cell, step 304. For the results shown in table 2, this is cell A (which happens to be a GSM cell) at frequency k The UE then performs a check that this is a GSM cell, step 305 and, if the check confirms that this is a GSM cell, the UE checks if this identified GSM cell is suitable, step 306. (If, at step 305 the UE determines that the cell is another UMTS cell, the process according to this embodiment of the invention terminates, step 307, as reselection of a same RAT cell is not the focus of the present discussion.) If the GSM cell is suitable, step 308, a successful cell reselection is made, step 310. However, if the cell is not suitable because it is barred for any reason (e.g. it is not suitable owing to cell information (for example because the cell is not on the same public land mobile network (PLMN) as that selected by the UE)), or not available because of transmission problems (such as synchronization cannot be achieved/system information cannot be decoded) step 312, the cell is barred as a candidate for reselection for the time $T_{barred}$, step 315. If there are cells left to check in Table 2, step 313, the UE then identifies the next highest ranked cell (frequency $f_7$, cell D), step 314, and checks if this is a GSM cell again, step 305. The process continues round the loop as above until successful cell reselection 310 takes place, or a re-scanning step 302 is required. When the rescan step 302 does take place, the UE removes details of the barred cell from the table for the time $T_{barred}$. As such, the barred cell is not considered as a candidate for reselection for this time interval. The UE may check for remaining identified cells (step 313) before starting the new cell reselection measurement. If a suitable cell is found then it is selected and the cell reselection evaluation process is started on the new cell.

This continues until a suitable cell is identified, the next best available cell is a UMTS cell or connection to all potential cells has failed, in which case the UE returns a message to the user, for instance "emergency calls only" or "no network coverage". The UE then periodically searches for a suitable cell.

When a GSM cell is deemed unsuitable, for whatever reason, the cell in question can be explicitly removed (barred) from the cell reselection measurements for a defined period of time as soon as it is determined that it is unsuitable or barred. During this time period, the cell will not be considered as a candidate for cell reselection.

Examples of the second RAT are GSM, GPRS or CDMA2000. The following are examples of barred or unsuitable cells: a cell with an "Intra-frequency cell-reselection indicator" set to "not allowed"; or a cell in which a service is not available, such as an emergency call service, a data service (such as a packet data service e.g. GPRS or email).

Figure 4:
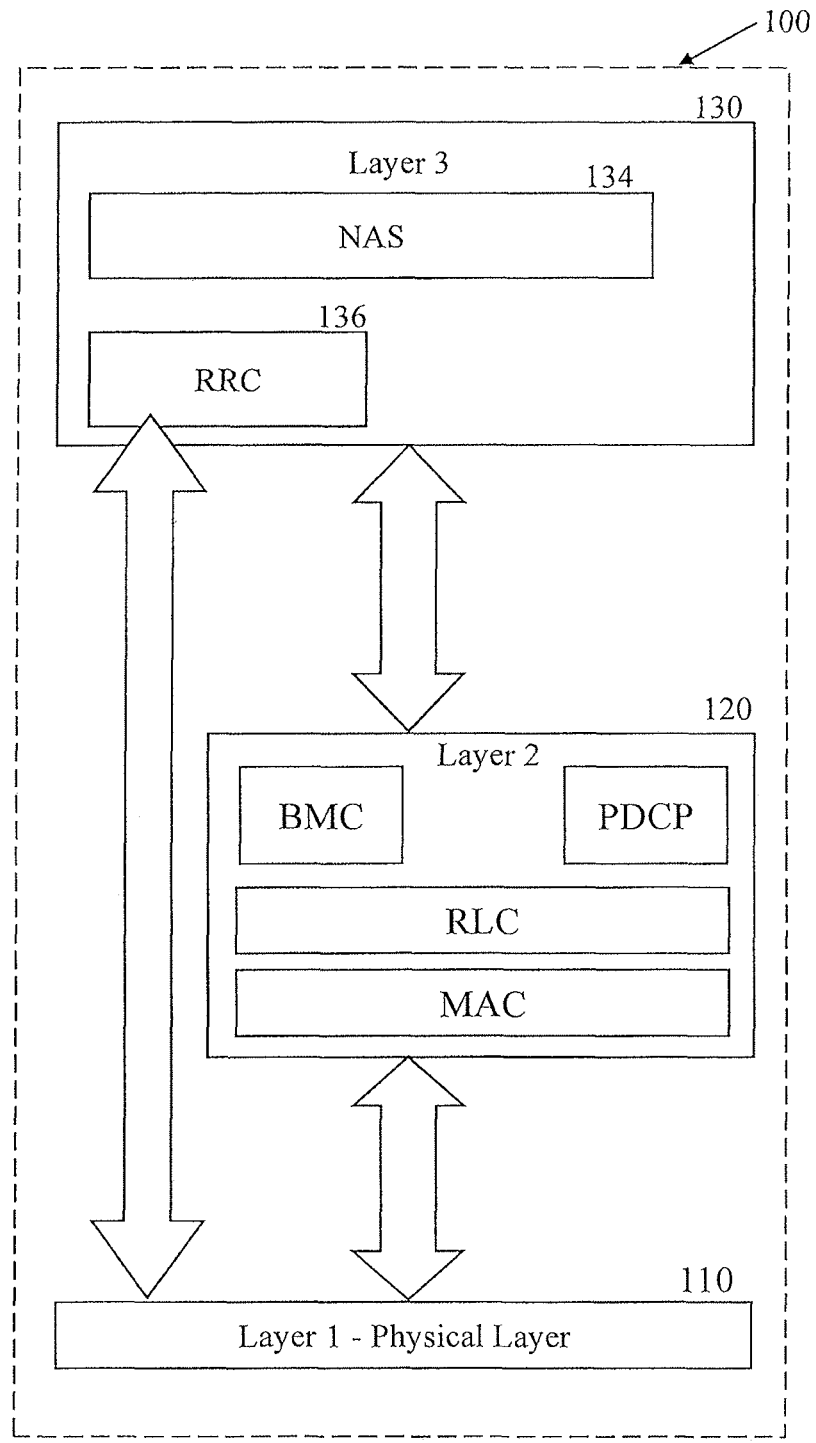
FIG. 4 is a block diagram illustrating an embodiment of a protocol stack apparatus provided with a RRC block, in accordance with the present application.

Referring to the drawings, FIG. 4 is a block diagram illustrating an embodiment of a UMTS protocol stack apparatus.

The RRC block 136 a sub layer of Layer 3 130 of a UMTS protocol stack 100. The RRC 136 exists in the control plane only and provides an information transfer service to the non-access stratum NAS 134. The RRC 136 is responsible for controlling the configuration of radio interface Layer 1 110 and Layer 2 120. When the UTRAN wishes to change the UE configuration it will issue a message to the UE containing a command to invoke a specific RRC procedure. The RRC 136 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply. Cell reselection may be implemented in the RRC.

Figure 5:
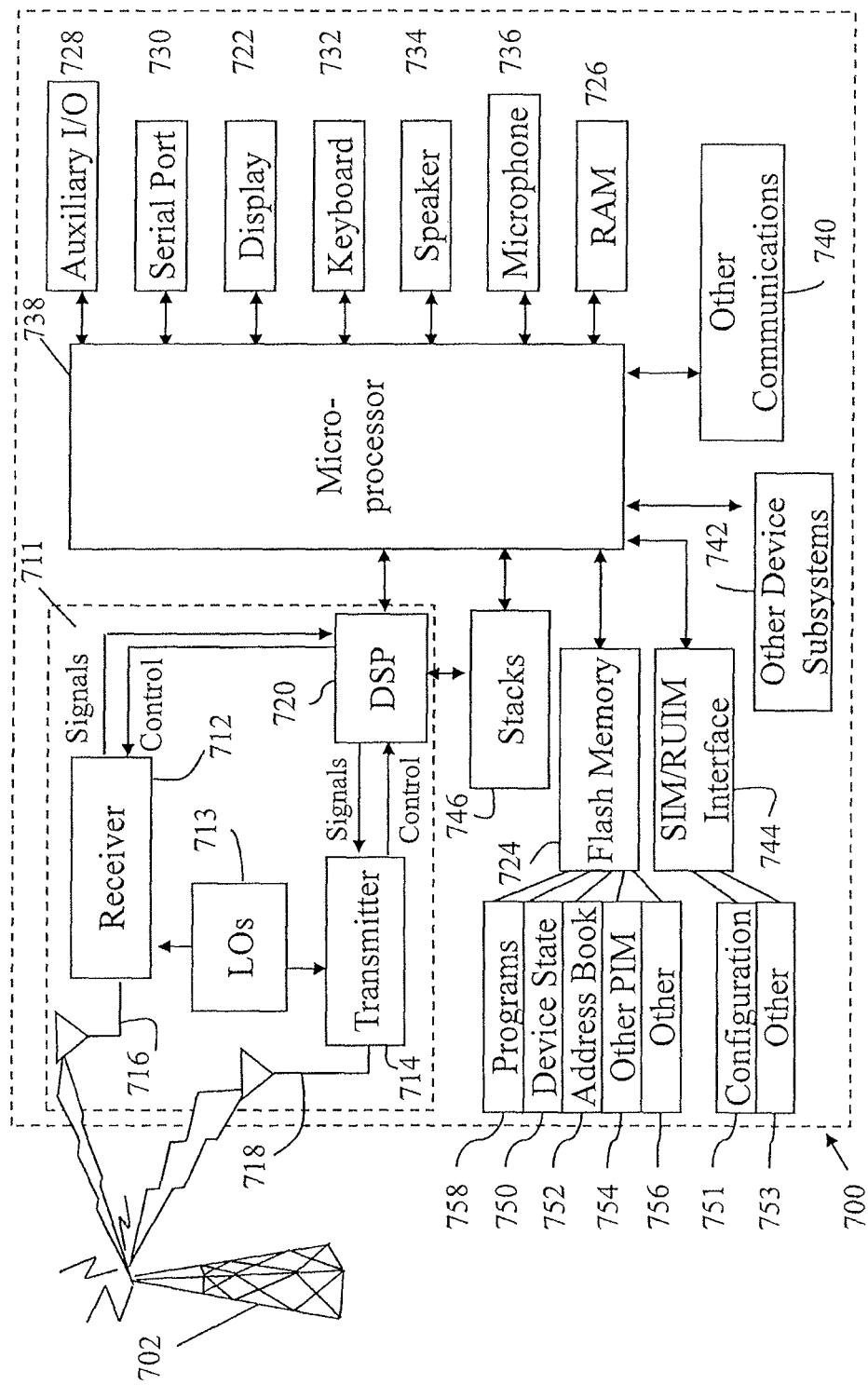
FIG. 5 is a block diagram illustrating a mobile device, which can act as a UE and co-operate with the apparatus and methods of FIGS. 1 to 5.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, or EDGE network.

Network access requirements will also vary depending upon the type of network 702. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 702. The SIM interface 744 is normally similar to a card-slot into which a SIM card can be inserted and ejected like a diskette or PCMCIA card. The SIM card can have approximately 64K of memory and hold many key configuration 751, and other information 753 such as identification, and subscriber related information.

When required network registration or activation procedures have been completed, mobile station 700 may send and receive communication signals over the network 702. Signals received by antenna 716 through communication network 702 are input to receiver 712, which may perform such common receiver functions as signal amplification, frequency down conversion, filtering, channel selection and the like, and in the example system shown in FIG. 7, analog to digital (NO) conversion. NO conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 702 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 5 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 702. In a preferred embodiment, the PIM data items are seamlessly integrated, synchronized and updated, via the wireless network 702, with the mobile station user's corresponding data items stored or associated with a host computer system. Further applications may also be loaded onto the mobile station 700 through the network 702, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 5, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of some of the steps may be immaterial with respect to the operation of the method. The ordering of the steps as described herein is not intended to be limiting.

It is also to be noted that where a method has been described it is intended that protection is also sought for a device arranged to carry out the method and where features have been claimed independently of each other these may be used together with other claimed features.

The invention claimed is:

1. A method of cell reselection by a user equipment device (UE), the UE operable with a first cellular Radio Access Technology (RAT) and a second cellular RAT, the method comprising:
   when the UE is camped on a cell of the first RAT, determining whether a cell of a second RAT is suitable for camping,
   the UE not considering said cell of the second RAT as a candidate for reselection if said cell of the second RAT is not suitable for camping, and further not considering said cell of the second RAT for a time period.

2. The method according to claim 1, further comprising considering said cell of the second RAT as a candidate for reselection after expiry of the time period.

3. The method according to claim 1, wherein not considering said cell of the second RAT comprises removing said cell from a list of neighboring cells.

4. The method according to claim 1, wherein not considering said cell of the second RAT comprises flagging said cell in a list of neighboring cells as being unsuitable for camping.

5. The method according to claim 1, wherein said cell of the second RAT is not suitable when it is barred.

6. The method according to claim 1, wherein said cell of the second RAT is not suitable due to being part of a list of barred cells.

7. The method according to claim 1, wherein said cell of the second RAT is not suitable due to being part of a list of unsuitable cells.

8. The method according to claim 1, wherein said cell of the second RAT is not suitable due to belonging to a public land mobile network (PLMN) that is not the same as a PLMN selected by the UE.

9. The method according to claim 1, wherein the time period is a maximum of 300 seconds.

10. The method according to claim 1, wherein the time period is 300 seconds.

11. The method according to claim 1, wherein the time period is a defined period of time.

12. The method according to claim 1, wherein the time period is a limited period of time.

13. The method according to claim 1, wherein the UE receives a list of neighboring cells including the cell of the second RAT.

14. The method of claim 1, wherein the first RAT is selected from a group including UMTS, GSM, or CDMA; and the second RAT is different from the first RAT and selected from the group including UMTS, GSM, or CDMA.

15. The method of claim 1, wherein the reselection is for camping.

16. The method of claim 1, wherein determining whether a cell of a second RAT is suitable for camping comprises:
generating measurement data for cells in a neighboring cell list;
identifying from the measurement data a cell that meets a cell reselection criterion; and
determining whether the identified cell is suitable for camping when the identified cell is a cell of the second RAT.

17. A user equipment device (UE) configured to be operable with a first cellular Radio Access Technology (RAT) and a second cellular RAT, the UE comprising:
a processor and memory, the UE being operable so that, when the UE is camped on a cell of the first RAT, it is determined whether a cell of a second RAT is suitable for camping,
wherein the UE does not consider said cell of the second RAT as a candidate for reselection if said cell of the second RAT is not suitable for camping, and further does not consider said cell of the second RAT for a time period.

18. The UE according to claim 17, further configured to consider said cell of the second RAT as a candidate for reselection after expiry of the time period.

19. The UE according to claim 17, wherein, in order to not consider said cell of the second RAT, the UE is configured to remove said cell from a list of neighboring cells.

20. The UE according to claim 17, wherein, in order to not consider said cell of the second RAT, the UE is arranged to flag said cell in a list of neighboring cells as being unsuitable for selection.

21. The UE according to claim 17, wherein said cell of a second RAT is not suitable when it is barred.

22. The UE according to claim 17, wherein said cell of a second RAT is not suitable due to being part of a list of barred cells.

23. The UE according to claim 17, wherein said cell of a second RAT is not suitable due to being part of a list of unsuitable cells.

24. The UE according to claim 17, wherein said cell of a second RAT is not suitable due to belonging to a public land mobile network (PLMN) that is not to the same as a PLMN selected by the UE.

25. The UE according to claim 17, wherein the time period is a maximum of 300 seconds.

26. The UE according to claim 17, wherein the time period is 300 seconds.

27. The UE according to claim 17, wherein the time period is a defined period of time.

28. The UE according to claim 17, further configured to receive a list of neighboring cells including the cell of the second RAT.

29. The UE of claim 17, wherein the first RAT is selected from a group including UMTS, GSM, GPRS or CDMA; and the second RAT is different from the first RAT and selected from the group including UMTS, GSM, GPRS, or CDMA.

30. The UE of claim 17, wherein the reselection is for camping.

31. The UE of claim 17, further operable to:
generate measurement data for cells in a neighboring cell list;
identify from the measurement data a cell that meets a cell reselection criterion; and
determine whether the identified cell is suitable for camping when the identified cell is a cell of the second RAT.

32. A method of cell reselection by a user equipment device (UE), the UE operable with a first cellular Radio Access Technology (RAT) and a second cellular RAT, the method comprising:
when the UE is camped on a cell of the first RAT,
the UE considering a cell of a second RAT as barred as a candidate for reselection for a time period if said cell of the second RAT is not suitable for camping.

33. The method according to claim 32, further comprising determining whether said cell of the second RAT is suitable for camping.

34. The method according to claim 32, further comprising considering said cell of the second RAT as a candidate for reselection after expiry of the time period.

35. The method according to claim 32, wherein considering said cell of the second RAT as barred comprises removing said cell from a list of neighboring cells.

36. The method according to claim 32, wherein considering said cell of the second RAT as barred comprises flagging said cell in a list of neighboring cells as being unsuitable for camping.

37. The method according to claim 32, wherein said cell of the second RAT is not suitable when it is barred.

38. The method according to claim 32, wherein said cell of the second RAT is not suitable due to being part of a list of barred cells.

39. The method according to claim 32, wherein said cell of the second RAT is not suitable due to being part of a list of unsuitable cells.

40. The method according to claim 32, wherein said cell of the second RAT is not suitable due to belonging to a public land mobile network (PLMN) that is not the same as a PLMN selected by the UE.

41. The method according to claim 32, wherein the time period is a maximum of 300 seconds.

42. The method according to claim 32, wherein the time period is 300 seconds.

43. The method according to claim 32, wherein the time period is a defined period of time.

44. The method according to claim 32, wherein the time period is a limited period of time.

45. The method according to claim 32, wherein the UE receives a list of neighboring cells including the cell of the second RAT.

46. The method of claim 32, wherein the first RAT is selected from a group including UMTS, GSM, or CDMA; and the second RAT is different from the first RAT and selected from the group including UMTS, GSM, or CDMA.

47. The method of claim 32, wherein the reselection is for camping.

48. The method of claim 32, further comprising:
generating measurement data for the cells in a neighboring cell list;
identifying from the measurement data a cell that meets a cell reselection criterion; and
determining whether the identified cell is suitable for camping when the identified cell is a cell of the second RAT.

49. A user equipment device (UE) configured to be operable with a first cellular Radio Access Technology (RAT) and a second cellular RAT, the UE comprising:
a processor and memory, the UE being operable so that, when the UE is camped on a cell of the first RAT,
the UE considers a cell of a second RAT as barred as a candidate for reselection for a time period if said cell of the second RAT is not suitable for camping.

50. The UE according to claim 49, wherein the UE is configured to determine whether said cell of the second RAT is suitable for camping.

51. The UE according to claim 49, further configured to consider said cell of the second RAT as a candidate for reselection after expiry of the time period.

52. The UE according to claim 49, wherein, in order to consider said cell of the second RAT as barred, the UE is configured to remove said cell from a list of neighboring cells.

53. The UE according to claim 49, wherein, in order to consider said cell of the second RAT as barred, the UE is arranged to flag said cell in a list of neighboring cells as being unsuitable for camping.

54. The UE according to claim 49, wherein said cell of the second RAT is not suitable when it is barred.

55. The UE according to claim 49, wherein said cell of the second RAT is not suitable due to being part of a list of barred cells.

56. The UE according to claim 49, wherein said cell of the second RAT is not suitable due to being part of a list of unsuitable cells.

57. The UE according to claim 49, wherein said cell of the second RAT is not suitable due to belonging to a public land mobile network (PLMN) that is not the same as a PLMN selected by the UE.

58. The UE according to claim 49, wherein the time period is a maximum of 300 seconds.

59. The UE according to claim 49, wherein the time period is 300 seconds.

60. The UE according to claim 49, wherein the time period is a defined period of time.

61. The UE according to claim 49, wherein the time period is a limited period of time.

62. The UE according to claim 49, further configured to receive a list of neighboring cells including the cell of the second RAT.

63. The UE of claim 49, wherein the first RAT is selected from a group including UMTS, GSM, or CDMA; and the second RAT is different from the first RAT and selected from the group including UMTS, GSM, or CDMA.

64. The UE of claim 49, wherein the reselection is for camping.

65. The UE of claim 49, further operable to:
generate measurement data for the cells in a neighboring cell list;
identify from the measurement data a cell that meets a cell reselection criterion; and
determine whether the identified cell is suitable for camping when the identified cell is a cell of the second RAT.

66. A method of cell reselection by a user equipment device (UE), the UE operable with a first cellular Radio Access Technology (RAT) and a second cellular RAT, the method comprising:
when the UE is camped on a cell of the first RAT,
determining whether a cell of a second RAT is suitable for camping,
the UE excluding said cell of the second RAT as a candidate for reselection for a time period if said cell of the second RAT is not suitable for camping.

67. The method according to claim 66, further comprising considering said cell of the second RAT as a candidate for reselection after expiry of the time period.

68. The method according to claim 66, wherein excluding said cell of the second RAT comprises removing said cell from a list of neighboring cells.

69. The method according to claim 66, wherein excluding said cell of the second RAT comprises flagging said cell in a list of neighboring cells as being unsuitable for camping.

70. The method according to claim 66, wherein said cell of the second RAT is not suitable when it is barred.

71. The method according to claim 66, wherein said cell of the second RAT is not suitable due to being part of a list of barred cells.

72. The method according to claim 66, wherein said cell of the second RAT is not suitable due to being part of a list of unsuitable cells.

73. The method according to claim 66, wherein said cell of the second RAT is not suitable due to belonging to a public land mobile network (PLMN) that is not the same as a PLMN selected by the UE.

74. The method according to claim 66, wherein the time period is a maximum of 300 seconds.

75. The method according to claim 66, wherein the time period is 300 seconds.

76. The method according to claim 66, wherein the time period is a defined period of time.

77. The method according to claim 66, wherein the time period is a limited period of time.

78. The method according to claim 66, wherein the UE receives a list of neighboring cells including the cell of the second RAT.

79. The method of claim 66, wherein the first RAT is selected from a group including UMTS, GSM, or CDMA; and the second RAT is different from the first RAT and selected from the group including UMTS, GSM, or CDMA.

80. The method of claim 66, wherein the reselection is for camping.

81. The method of claim 66, wherein determining whether a cell of a second RAT is suitable for camping comprises:
generating measurement data for cells in a neighboring cell list;
identifying from the measurement data a cell that meets a cell camping criterion; and
determining whether the identified cell is suitable for camping when the identified cell is a cell of the second RAT.

82. A user equipment device (UE) configured to be operable with a first cellular Radio Access Technology (RAT) and a second cellular RAT, the UE comprising:
a processor and memory, the UE being operable so that, when the UE is camped on a cell of the first RAT, it is determined whether a cell of a second RAT is suitable for camping,
wherein the UE excludes said cell of the second RAT as a candidate for reselection for a time period if said cell of the second RAT is not suitable for camping.

83. The UE according to claim 82, further configured to consider said cell of the second RAT as a candidate for reselection after expiry of the time period.

84. The UE according to claim 82, wherein, in order to exclude said cell of the second RAT, the UE is configured to remove said cell from a list of neighboring cells.

85. The UE according to claim 82, wherein, in order to exclude said cell of the second RAT, the UE is arranged to flag said cell in a list of neighboring cells as being unsuitable for camping.

86. The UE according to claim 82, wherein said cell of the second RAT is not suitable when it is barred.

87. The UE according to claim 82, wherein said cell of the second RAT is not suitable due to being part of a list of barred cells.

88. The UE according to claim 82, wherein said cell of the second RAT is not suitable due to being part of a list of unsuitable cells.

89. The UE according to claim 82, wherein said cell of the second RAT is not suitable due to belonging to a public land mobile network (PLMN) that is not the same as a PLMN selected by the UE.

90. The UE according to claim 82, wherein the time period is a maximum of 300 seconds.

91. The UE according to claim 82, wherein the time period is 300 seconds.

92. The UE according to claim 82, wherein the time period is a defined period of time.

93. The UE according to claim 82, wherein the time period is a limited period of time.

94. The UE according to claim 82, further configured to receive a list of neighboring cells including the cell of the second RAT.

95. The UE of claim 82, wherein the first RAT is selected from a group including UMTS, GSM, or CDMA; and the second RAT is different from the first RAT and selected from the group including UMTS, GSM, or CDMA.

96. The UE of claim 82, wherein the reselection is for camping.

97. The UE of claim 82, further operable to:
generate measurement data for cells in a neighboring cell list;
identify from the measurement data a cell that meets a cell reselection criterion; and
determine whether the identified cell is suitable for camping when the identified cell is a cell of the second RAT.

* * * * *